United States Patent [19]

Anzai

[11] 4,037,943
[45] July 26, 1977

[54] REFLECTION TYPE IMAGE FORMING OPTICAL SYSTEM HAVING A LARGE ANGLE OF VIEW

[75] Inventor: Satoru Anzai, Inagi, Japan
[73] Assignee: Nippon Kogaku K.K., Tokyo, Japan
[21] Appl. No.: 557,185
[22] Filed: Mar. 10, 1975
[30] Foreign Application Priority Data
  Mar. 19, 1974  Japan .................................. 49-30547
[51] Int. Cl.² ............................................. G02B 17/06
[52] U.S. Cl. ..................................... 350/294; 350/206
[58] Field of Search ................ 350/294, 199, 181, 206

[56] References Cited
U.S. PATENT DOCUMENTS

| | | | |
|---|---|---|---|
| 2,737,850 | 3/1956 | Raitiere | 350/294 |
| 3,112,355 | 11/1963 | Ross | 350/181 |
| 3,203,328 | 8/1965 | Brueggeman | 350/294 |
| 3,707,325 | 12/1972 | Hardeman | 350/294 |

*Primary Examiner*—John K. Corbin
*Assistant Examiner*—Conrad Clark
*Attorney, Agent, or Firm*—Shapiro and Shapiro

[57] ABSTRACT

A reflection type image forming optical system having a large angle of view comprises a convex mirror for reflecting incident light and a concave mirror. The concave mirror is disposed with the reflecting surface thereof facing the reflecting surface of the convex mirror so that light reflected by the convex mirror at a large angle with respect to the normal thereof enters the concave mirror at a large angle and that light reflected by the convex mirror at a small angle with respect to the normal thereof enters the concave mirror at a small angle. The concave mirror is arranged so that the distance between the center of curvature of the convex mirror and that of the concave mirror is greater than half the radius of curvature of the concave mirror.

3 Claims, 2 Drawing Figures

4,037,943

REFLECTION TYPE IMAGE FORMING OPTICAL SYSTEM HAVING A LARGE ANGLE OF VIEW

BACKGROUND OF THE INVENTION

1. Field of the Invention

This invention relates to a reflection type image forming optical system having a large angle of view.

2. Description of the Prior Art

According to the conventional method of forming an image of wide field by the use of a reflecting system, as is shown in FIG. 1 of the accompanying drawings, a virtual image of a body has been formed by a convex reflecting mirror M1 and focused by a refraction type optical system L which has corrected aberrations in itself. With such method, however, in order to reduce the influence imparted to the focused image by the astigmatism created by the convex reflecting mirror M1, the disturbance of the image caused by the astigmatism resulting from the convex reflecting mirror M1 must be confined within the depth of field of the refraction type optical system L as by reducing the opening of the refraction type optical system or increasing the distance between the virtual image formed by the convex mirror M1 and the refraction type optical system L. Thus, in order to provide a desired image formation without increasing the F-number of the entire image forming optical system, the convex mirror M1 is necessarily very bulky. In addition, the center of the field is shadowed by a refraction type optical system and, as a result, observation of the object body is difficult. Also, the use of the refraction type optical system has caused absorption so great for light having short wave length, for example ultraviolet light and the like (less than 350 mu), that the system is inadequate for light of this kind.

SUMMARY OF THE INVENTION

It is an object of the present invention to provide a bright reflection type optical system having a large angle of view which eliminates the above-noted disadvantages.

According to the present invention, there is provided a reflecting type image forming optical system having a large angle of view which comprises a convex reflecting mirror for reflecting incident light and a concave reflecting mirror. The concave mirror is disposed with the reflecting surface thereof facing the reflecting surface of the convex mirror so that a light beam reflected by the convex mirror at a large angle with respect to the normal thereof enters the concave mirror at a large angle, and so that a light beam reflected by the convex mirror at a small angle with respect to the normal thereof enters the concave mirror at a small angle. The concave mirror is arranged with respect to the convex mirror so that the distance between the center of curvature of the convex mirror and the center of curvature of the concave mirror is greater than half the radius of curvature of the concave mirror.

The reflecting type image forming optical system of the present invention may further comprise a stop disposed between the convex mirror and the concave mirror.

The invention will become more fully apparent from the following detailed description thereof, taken in conjunction with FIG. 2 of the accompanying drawings.

DESCRIPTION OF THE PREFERRED EMBODIMENTS

Figure 1:
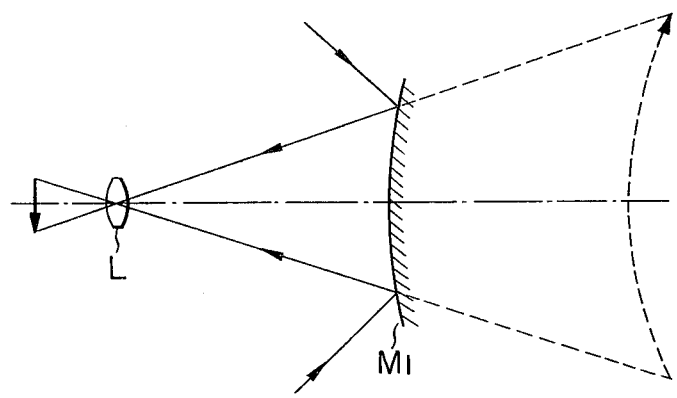
FIG. 1 is a cross-sectional view of a refraction type reflecting optical system having a large angle of view which, as previously indicated, constitutes a system in accordance with the prior art.
Figure 2:
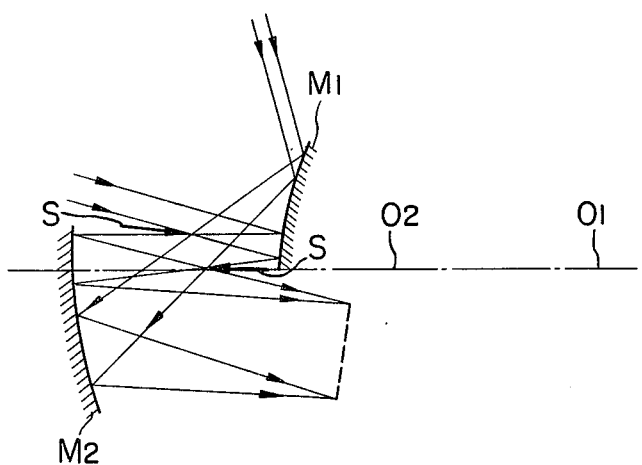
FIG. 2 is a cross-sectional view of a reflection type image forming optical system according to the present invention.

Referring to FIG. 2, M1 and M2 designate a convex reflecting mirror and concave reflection mirror, respectively, and S is a stop. The center of curvature of the convex reflecting mirror M1 is at $0_1$, and that of the concave mirror M2 at $0_2$. Light impinging on the convex mirror M1 forms a virtual image of an object body reflected in accordance with the law of reflection, but unavoidably creates astigmatism. The greater the angle of incidence, the greater the astigmatism. A decrease in the angle of incidence reduces astigmatism. This also holds true for the concave reflecting mirror M2, except that the astigmatism created is opposite in sign. Therefore, the astigmatisms created by the two mirrors will negate each other if the mirrors are arranged so that light rays reflected upon the convex mirror M1 at large angles enter the concave mirror M2 at large angles, and light rays reflected upon the convex mirror M1 at small angles enter the concave mirror M2 at small angles.

Of the possible arrangements which will satisfy the aforementioned relationship, those in which the convex mirror M1 intersects the focal plane or wherein the concave mirror M2 impedes the field of view are impractical. Further, if the radius of curvature of the concave mirror M2 is $r_2$, the distance $\overline{0_1 0_2}$ between the center of curvature of the two mirrors must be greater than $r_2/2$. This is so because if $\overline{0_1 0_2} < (r_2/2)$, a stop opening for restricting unnecessary light could not be provided between the convex mirror M1 and the concave mirror M2.

Design limitations for brightness will now be considered. If it is desired that the entire optical system be of large aperture, it will be necessary that $r_1 \geq (r_2/2)$, where $r_1$ is the radius of curvature of the convex mirror M1. Conversely, the entire optical system may be of small aperture, but then a relationship $r_1 < (r_2/2)$ would be needed if a greater operating distance is desired.

According to the present invention, image formation is effected only by the reflecting optical system and this eliminates any chromatic aberration. The image formation is feasible over a wide range, from the vacuum-ultraviolet area to the far-infrared area. Image formation over such wide range cannot be accomplished by the refraction type optical system. Further, as previously noted, the prior art system has necessitated providing a great distance between the virtual image formed by the convex mirror M1 and the optical system L. With the system of the present invention, astigmatism is eliminated, and it is not necessary to provide a great distance between the virtual image by the convex mirror and the concave mirror. As a result, the system of the invention affords compactness and light weight. Furthermore, the fact that the focal plane is situated on the opposite side to the object body with respect to the convex mirror M1 leads to an advantage not possible heretofore in that no part of the effective field of view may be interrupted by any electronic devices of larger size, such as pick-up tubes or the like, which may be disposed in and behind the focal plane.

Numerical data for some examples of the present invention are shown below.

First Example:

Focal length of the entire system $f = 100$ $F/3.3$
Angle of view 60° $\overline{O_1O_2} = 173.4$
$r_1 = 263.3$
$r_2 = 263.3$ Second Example Focal length of the entire system $f = 100$ $F/3.3$
Angle of view 60°
$r_1 = 600.0$ $\overline{O_1O_2} = 300.0$
$r_2 = 300.0$ In both examples, $r_1$ and $r_2$ represent the radii of curvature of the convex mirror M1 and the concave mirror M2, respectively, and $\overline{O_1O_2}$ is the distance between the center of curvature of the convex mirror M1 and that the concave mirror M2.

It is believed that the advantages and improved results afforded by the reflection type image forming optical system of the invention will be apparent from the foregoing detailed description of a preferred embodiment thereof. It will be apparent that various modifications and changes may be made without departing from the spirit and scope of the invention as sought to be defined in the following claims.

I claim:

1. A reflection type image forming optical system having a large angle of view comprising:
    a convex spherical reflecting mirror for reflecting incident light;
    a concave spherical reflecting mirror disposed with the reflecting surface thereof facing the reflecting surface of the convex mirror, the concave mirror being arranged so that the distance between the center of curvature of the convex mirror and the center of curvature of the concave mirror is greater than half the radius of curvature of the concave mirror; and
    a stop disposed between said reflecting surfaces of the convex and concave mirrors, the stop being arranged to select only light that enters the concave mirror at the large angle with respect to the normal thereof, when reflected by the convex mirror at a large angle, and that enters the concave mirror at a small angle with respect to the normal thereof, when reflected by the convex mirror at a small angle.

2. A system according to claim 1, wherein with a focal length (f) of the system of 100 at F/3.3 to furnish an angle of view of 60°, the distance between the center of curvature of convex mirror and the center of curvature of the concave mirror is 173.4, and the radius of curvature of the concave mirror is 263.3.

3. A system according to claim 1, wherein with a focal length (f) of the system of 100 at F/3.3 to furnish an angle of view of 60°, the distance between the center of curvature of convex mirror and the center of curvature of the concave mirror is 300.0, and the radius of curvature of the concave mirror is 300.0.

* * * * *